US012684325B2

(12) United States Patent
Sedlacek et al.

(10) Patent No.: US 12,684,325 B2
(45) Date of Patent: Jul. 14, 2026

(54) CORE NETWORK BECOMING AWARE OF PLMNs WITH DISASTER CONDITIONS

(71) Applicant: Telefonaktiebolaget LM Ericsson (publ), Stockholm (SE)

(72) Inventors: Ivo Sedlacek, Hovorcovice (CZ); Mikael Wass, Sätila (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 412 days.

(21) Appl. No.: 18/035,321

(22) PCT Filed: Nov. 5, 2021

(86) PCT No.: PCT/IB2021/060285
§ 371 (c)(1),
(2) Date: May 4, 2023

(87) PCT Pub. No.: WO2022/097098
PCT Pub. Date: May 12, 2022

(65) Prior Publication Data
US 2024/0015493 A1        Jan. 11, 2024

Related U.S. Application Data

(60) Provisional application No. 63/110,229, filed on Nov. 5, 2020.

(51) Int. Cl.
*H04W 4/00*          (2018.01)
*H04W 4/90*          (2018.01)
(Continued)

(52) U.S. Cl.
CPC ............. *H04W 4/90* (2018.02); *H04W 12/06* (2013.01); *H04W 84/042* (2013.01)

(58) Field of Classification Search
CPC ..... H04W 4/90; H04W 12/06; H04W 84/042; H04W 48/18
See application file for complete search history.

(56) References Cited

U.S. PATENT DOCUMENTS

| | | | |
|---|---|---|---|
| 8,094,651 B2 * | 1/2012 | Taaghol | H04L 67/141 |
| | | | 455/435.2 |
| 10,834,571 B1 * | 11/2020 | Yau | H04W 12/06 |

(Continued)

FOREIGN PATENT DOCUMENTS

| | | |
|---|---|---|
| EP | 2445244 A1 | 4/2012 |
| EP | 3525520 A1 | 8/2019 |

(Continued)

OTHER PUBLICATIONS

Author Unknown, "Technical Specification Group Core Network and Terminals; Technical realization of Cell Broadcast Service (CBS) (Release 17)," Technical Specification 23.041, Version 17.0.0, Sep. 2020, 3GPP Organizational Partners, 100 pages.

(Continued)

*Primary Examiner* — Omoniyi Obayanju
(74) *Attorney, Agent, or Firm* — Sonoda & Kobayashi Intellectual Property Law; Sarvajit S. Patil

(57)        ABSTRACT

Systems and methods for enabling User Equipments (UEs) to use a Public Land Mobile Network (PLMN) failing service under disaster conditions and to receive services from alternative PLMNs. In some embodiments, a method performed by a first network node comprises receiving, from a second network node, a first disaster roaming PLMN list. The method also comprises determining that a UE is to be authenticated. The method further comprises providing, to a third network node, a request including the disaster roaming PLMN list, responsive to determining that the UE is to be (Continued)

authenticated. In this way, an interruption of the service at the UE is minimized in case of the disaster conditions.

10 Claims, 10 Drawing Sheets

(51) Int. Cl.
*H04W 12/06* (2021.01)
*H04W 84/04* (2009.01)

(56) References Cited

U.S. PATENT DOCUMENTS 11,943,732 B2 * 3/2024 Chun ....................... H04W 4/90
2023/0156862 A1 * 5/2023 Park ...................... H04W 48/18
455/404.1

FOREIGN PATENT DOCUMENTS

| EP | 3905737 | A1 | 11/2021 |
|---|---|---|---|
| WO | 2020141956 | A1 | 7/2020 |
| WO | 2020141965 | A1 | 7/2020 |
| WO | 2020204309 | A1 | 10/2020 |
| WO | 2022097096 | A1 | 5/2022 |

OTHER PUBLICATIONS

Author Unknown, "Technical Specification Group Core Network and Terminals; Non-Access-Stratum (NAS) functions related to Mobile Station (MS) in idle mode (Release 17)," Technical Specification 23.122, Version 17.0.0, Sep. 2020, 3GPP Organizational Partners, 83 pages.
Author Unknown, "Technical Specification Group Core Network and Terminals; Non-Access Stratum (NAS) protocol for Evolved Packet System (EPS); Stage 3 (Release 17)," Technical Specification 24.301, Version 17.0.0, Sep. 2020, 3GPP Organizational Partners, 585 pages.
Author Unknown, "Technical Specification Group Core Network and Terminals; Non-Access-Stratum (NAS) protocol for 5G System (5GS); Stage 3; (Release 17)," Technical Specification 24.501, Version 17.0.0, Sep. 2020, 3GPP Organizational Partners, 728 pages.
Author Unknown, "Technical Specification Group Core Network and Terminals; Access to the 3GPP 5G Core Network (5GCN) via Non-3GPP Access Networks (N3AN); Stage 3 (Release 17)," Technical Specification 24.502, Version 17.0.0, Sep. 2020, 3GPP Organizational Partners, 88 pages.
Author Unknown, "Technical Specification Group Radio Access Network; NR; NR and NG-RAN Overall Description; Stage 2 (Release 16)," Technical Specification 38.300, Version 16.3.0, Sep. 2020, 3GPP Organizational Partners, 148 pages.
Ericsson, "C1-20xxxx: MINT: solutions for all key issues," 3GPP TSG-CT WG1 Meeting #126-e, Oct. 15-23, 2020, Electronic Meeting, 7 pages.
Ericsson, "C1-20xxxx: MINT: alternative 1 for How do other PLMNs indicate that they can accept"Disaster Inbound Roamers, 3GPP TSG-CT WG1 Meeting #126-e, Oct. 15-23, 2020, Electronic Meeting, 2 pages.
Ericsson, "C1-20xxxx: MINT: alternative 2 for How do other PLMNs indicate that they can accept "Disaster Inbound Roamers, 3GPP TSG-CT WG1 Meeting #126-e, Oct. 15-23, 2020, 2 pages.
Ericsson, C1-20xxxx: MINT: solution for How are UEs/subscribers notified that a "Disaster Condition applies," 3GPP TSG-CT WG1 Meeting #126-e, Oct. 15-23, 2020, Electronic Meeting, 1 page.
Ericsson, "C1-20xxxx: MINT: solution for How can UE/subscribers perform network selection for disaster roaming," 3GPP TSG-CT WG1 Meeting #126-e, Oct. 15-23, 2020, Electronic Meeting, 1 page.
International Search Report and Written Opinion for International Patent Application No. PCT/IB2021/060283, mailed Feb. 9, 2022, 17 pages.
Written Opinion for International Patent Application No. PCT/IB2021/060283, mailed Oct. 4, 2022, 8 pages.
International Preliminary Report on Patentability for International Patent Application No. PCT/IB2021/060283, mailed Jan. 30, 2023, 30 pages.
Qualcomm Incorporated, "C1-205944: Key Issues for MINT," 3GPP TSG CT WG1 Meeting #126-e, Oct. 15-23, 2020, Electronic Meeting, 3 pages.
International Search Report and Written Opinion for International Patent Application No. PCT/IB2021/060285, mailed Jan. 19, 2022, 20 pages.

* cited by examiner

CORE NETWORK BECOMING AWARE OF PLMNs WITH DISASTER CONDITIONS

RELATED APPLICATIONS

This application is a 35 U.S.C. § 371 national phase filing of International Application No. PCT/IB2021/060285, filed Nov. 5, 2021, which claims the benefit of provisional patent application Ser. No. 63/110,229, filed Nov. 5, 2020, the disclosures of which are hereby incorporated herein by reference in their entireties.

TECHNICAL FIELD

The present disclosure relates to solutions enabling User Equipments (UEs) to use a Public Land Mobile Network (PLMN) failing service under disaster conditions and to receive services from alternative PLMNs, thus, to minimize service interruption in case of the disaster conditions.

BACKGROUND

High availability of the Fifth Generation (5G) system has been discussed in Third Generation Partnership Project (3GPP) and it has been decided to perform studies to seek solutions to minimize service interruption in case of disaster conditions impacting a Public Land Mobile Network (PLMN). Solutions that enable UEs using a PLMN failing service due to disaster condition to receive service using alternative PLMNs are to be studied. For example, at 3GPP TSG-CT WG1 Meeting #126-e (Electronic meeting; 15-23 Oct. 2020), the following documents have been submitted: (1) "MINT: solutions for all key issues"; (2) "MINT: alternative 1 for How are other PLMNs (=not subject to the disaster) notified that a "Disaster Condition" applies/no longer applies?"; (3) "MINT: alternative 2 for How are other PLMNs (=not subject to the disaster) notified that a "Disaster Condition" applies/no longer applies?"; (4) "MINT: solution for How are UE/subscribers notified that the "Disaster Condition" no longer applies?"; (5) "MINT: alternative 1 for Registration to the roaming PLMN (=not subject to the disaster) in case of the "disaster condition""; and (6) "MINT: alternative 2 for Registration to the roaming PLMN (=not subject to the disaster) in case of the "disaster condition"".

The intention of the studies described in the above documents is to identify solutions that can be introduced in the 3GPP standard. However, there are no existing solutions for the use cases of the studies in the current baseline 3GPP 5G system.

There currently exist certain challenge(s). In the above-described document titled "MINT: solutions for all key issues," the following key issues were proposed:

Key Issue #2: How are other PLMNs (=not subject to the disaster) notified that a "Disaster Condition" applies/no longer applies?

Key Issue #4: How do other PLMNs (=not subject to the disaster) authenticate "Disaster Inbound Roamers"?

Key Issue #5: How are subscribers notified that the "Disaster Condition" no longer applies?

Current Fifth Generation (5G) system do not support any mechanisms for the above key issues, and enhancements are needed to introduce the mechanisms to solve the above key issues.

SUMMARY

Embodiments of enabling User Equipments (UEs) to use a Public Land Mobile Network (PLMN) failing service under disaster conditions and to receive services from alternative PLMNs are disclosed. In one embodiment, a method performed by a first network node comprises receiving, from a second network node, a first disaster roaming PLMN list. The method also comprises determining that a UE is to be authenticated. The method further comprises providing, to a third network node, a request including the disaster roaming PLMN list, responsive to determining that the UE is to be authenticated. In this way, an interruption of the service at the UE is minimized in case of the disaster conditions.

In one embodiment, the request is a Nausf_UEAuthentication_Authenticate Request.

In one embodiment, the first network node comprises an Access Management Function (AMF). The second network node comprises a Radio Access Network (RAN) node. The third network node comprises an Authentication Server Function (AUSF).

In one embodiment, determining that the UE is to be authenticated further comprises determining that the UE is identified by a UE identifier.

In one embodiment, the UE identifier is a network-specific identifier based Subscription Concealed Identifier (SUCI) or International Mobile Subscriber Identity (IMSI) based SUCI.

In one embodiment, providing, to the third network node, the request including the disaster roaming PLMN list comprises providing, the third network node, the request including the disaster roaming PLMN list, responsive to determining that the UE is to be authenticated and determining that the UE is identified by the UE identifier.

In one embodiment, receiving an indication that the UE performs a disaster roaming and a PLMN ID of a home PLMN (HPLMN) of the UE.

In one embodiment, receiving, from the second network node, a second disaster roaming PLMN list that does not include the HPLMN of the UE and triggering the UE to perform a PLMN selection.

In one embodiment, determining that the UE is in a Fifth Generation System Mobility Management (5GMM)-CONNECTED mode and performing a UE configuration update procedure with an indication that a disaster condition of the HPLMN of the UE was resolved, or triggering the UE to perform a mobility registration update and rejecting the mobility registration update with an indication that the disaster condition in the HPLMN of the UE is resolved.

In one embodiment, determining that the UE is in a 5GMM-IDLE mode and attempts to move to a 5GMM-CONNECTED mode; and rejecting an initial Non-Access Stratum (NAS) request with an indication that a disaster condition in the HPLMN of the UE was resolved.

In one embodiment, a method performed by a first network node, comprising receiving, from a second network node, a request including a disaster roaming Public Land Mobile Network (PLMN) list, a serving network name of the request indicating a network in which a UE is not allowed to roam in a non-disaster condition, the disaster roaming PLMN list including a PLMN ID of a PLMN of the first network node and authenticating the UE.

In one embodiment, the request is a Nausf_UEAuthentication_Authenticate Request.

In one embodiment, authenticating the UE further comprises informing the second network node about the UE performing the disaster roaming and providing the second network node with a PLMN ID of a HPLMN of the UE.

In one embodiment, a method performed by a first network node comprises receiving, from a second network node, a first disaster PLMN list, determining that a UE (112) is identified by an IMSI based SUCI; determining that a PLMN ID of the IMSI based SUCI is in the disaster roaming PLMN list; determining that the UE is to be authenticated; and providing, to a third network node, a request including the disaster-roaming-request.

In one embodiment, the request is a Nausf_UEAuthentication_Authenticate Request.

In one embodiment, receiving an indication that the UE performs a disaster roaming and a PLMN ID of a HPLMN of the UE.

In one embodiment, receiving, from the second network node, a second disaster roaming PLMN list that does not include the HPLMN of the UE; and triggering the UE to perform a PLMN selection.

In one embodiment, determining the UE is in a 5GMM-CONNECTED mode; and performing a UE configuration update procedure with an indication that a disaster condition of a HPLMN of the UE was resolved, or triggering the UE to perform a mobility registration update and rejecting the mobility registration update with an indication that the disaster condition in the HPLMN of the UE is resolved.

In one embodiment, determining the UE is in a 5GMM-IDLE mode and attempts to move to a 5GMM-CONNECTED mode; and rejecting an initial NAS request with an indication that the disaster condition in the HPLMN of the UE was resolved.

In one embodiment, a method in a first network node comprises receiving, from a second network node, a request indicating a disaster-roaming-request, the serving network name of the Nausf_UEAuthentication_Authenticate Request indicating a network in which a UE is not allowed to roam in a non-disaster condition and authenticating the UE.

In one embodiment, the request is a Nausf_UEAuthentication_Authenticate Request.

In one embodiment, a method performed by a first network node comprises receiving, from a second network node, a message comprising a first disaster roaming PLMN and an area list including a first PLMN and a first area; and providing the first disaster roaming PLMN and area list to a third network node of a PLMN that serves at least one area in the disaster roaming PLMN and area list.

In one embodiment, the message further comprises a previous disaster roaming PLMN and area list; and the third network node serves at least one area in the previous disaster roaming PLMN and area list.

In one embodiment, a method performed by a first network node, comprises Receiving a disaster roaming PLMN and an area list; determining that the first network node serves at least one area of the disaster roaming PLMN and area list; and storing a previously stored disaster roaming PLMN and area list to replace a previously stored disaster roaming PLMN and area list.

In one embodiment, receiving, from a second network node, an indication that a UE identified by a SUCI attempts to register via the second network node in an area indicated in the disaster roaming PLMN and area list; determining the UE is to be authenticated; and providing a request including the disaster roaming PLMN and area list to a third network node. The disaster roaming PLMN and area list comprise all PLMNs for which disaster roaming is possible in the area served by the second network node.

In one embodiment, the request is a Nausf_UEAuthentication_Authenticate Request.

In one embodiment, determining the first disaster roaming PLMN and area list does not include the PLMN ID of a HPLMN of a UE; determining that the UE is in the 5GMM-CONNECTED mode; and performing a UE configuration update procedure with an indication that a disaster condition of the HPLMN of the UE was resolved, or triggering the UE to perform a mobility registration update and rejecting the mobility registration update with an indication that the disaster condition in the HPLMN of the UE is resolved.

In one embodiment, determining that the first disaster roaming PLMN and area list does not include the PLMN ID of a HPLMN of a UE; determining that the UE is in the 5GMM-IDLE mode and attempts to move to the 5GMM-CONNECTED mode; and rejecting an initial NAS request with an indication that a disaster condition in the HPLMN of the UE was resolved.

In one embodiment, a method performed by a first network node, comprises receiving, from a second network node, a request including a disaster roaming PLMN and area list; determining that the serving network name of the request comprises a network in which a UE is not allowed to roam in a non-disaster condition; determining that the disaster roaming PLMN and area list includes a PLMN ID of a PLMN of the first network node and authenticating the UE.

In one embodiment, the request is a Nausf_UEAuthentication_Authenticate Request.

In one embodiment, authenticating the UE comprises: informing the second network node about the UE performing the disaster roaming; and providing the PLMN ID of a HPLMN of the UE to the second network node.

In one embodiment, a method performed by a first network node comprises receiving a disaster roaming PLMN and area list; removing a previously stored disaster roaming PLMN and area list; and storing the received disaster roaming PLMN and area list.

In one embodiment, determining that the first network node serves at least one area of the disaster roaming PLMN and area list.

In one embodiment, the method further comprises determining that a UE identified by a SUCI attempts to register via a second network node in an area indicated in the disaster roaming PLMN and area list; determining that a PLMN ID of the SUCI and an area served by the second network node are in the stored disaster roaming PLMN and area list; determining that the UE is to be authenticated; and providing a request including a disaster-roaming-request to a third network node.

In one embodiment, the method further comprises receiving an indication that the UE performs a disaster roaming and a PLMN ID of a HPLMN of the UE.

In one embodiment, the method further comprises receiving, from the second network node, a second disaster roaming PLMN list that does not include the HPLMN of the UE; and triggering the UE to perform a PLMN selection.

In one embodiment, the request is a Nausf_UEAuthentication_Authenticate Request.

In one embodiment, the method further comprises determining the first disaster roaming PLMN and area list does not include the PLMN ID of a HPLMN of a UE; determining that the UE was authenticated; determining that the UE is in the 5GMM-CONNECTED mode; and performing a UE configuration update procedure with an indication that a disaster condition of the HPLMN of the UE was resolved, or triggering the UE to perform a mobility registration update and rejecting the mobility registration update with an indication that the disaster condition in the HPLMN of the UE is resolved.

In one embodiment, the method further comprises determining that the first disaster roaming PLMN and area list does not include the PLMN ID of a HPLMN of a UE; determining that the UE was authenticated; determining that the UE is in the 5GMM-IDLE mode and attempts to move to the 5GMM-CONNECTED mode; and rejecting an initial NAS request with an indication that the disaster condition in the home PLMN of the UE was resolved.

In one embodiment, a method performed by a first network node, comprises receiving, from a second network node, a request including a disaster PLMN and area list; determining the serving network name of the request comprises a network in which a UE is not allowed to roam in a non-disaster condition and authenticating the UE.

In one embodiment, the request is a Nausf_UEAuthentication_Authenticate Request.

Corresponding embodiments of network nodes are also disclosed.

In one embodiment, a first network node is adapted to receive, from a second network node, a first disaster roaming PLMN list; determine that a UE is to be authenticated; and provide, to a third network node, a request including the disaster roaming PLMN list, responsive to determining that the UE is to be authenticated.

In one embodiment, a first network node comprising processing circuitry configured to cause the first network node to receive, from a second network node, a first disaster roaming PLMN list; determine that a UE is to be authenticated; and provide, to a third network node, a request including the disaster roaming PLMN list, responsive to determining that the UE is to be authenticated.

In one embodiment, a first network node is adapted to receive, from a second network node, a request including a disaster roaming PLMN list, a serving network name of the request indicating a network in which a UE is not allowed to roam in a non-disaster condition, the disaster roaming PLMN list including a PLMN ID of a PLMN of the first network node and authenticate the UE.

In one embodiment, a first network node comprising processing circuitry configured to cause the first network node to receive, from a second network node, a request including a disaster roaming PLMN list, a serving network name of the request indicating a network in which a UE is not allowed to roam in a non-disaster condition, the disaster roaming PLMN list including a PLMN ID of a PLMN of the first network node and authenticate the UE.

In one embodiment, a first network node is adapted to receive, from a second network node, a first disaster PLMN list, determining that a UE is identified by an IMSI based SUCI; determine that a PLMN ID of the IMSI based SUCI is in the disaster roaming PLMN list; determine that the UE is to be authenticated; and provide, to a third network node, a request including the disaster-roaming-request.

In one embodiment, a first network node comprising processing circuitry configured to cause the first network node to receive, from a second network node, a first disaster PLMN list, determining that a UE is identified by an IMSI based SUCI; determine that a PLMN ID of the IMSI based SUCI is in the disaster roaming PLMN list; determine that the UE is to be authenticated; and provide, to a third network node, a request including the disaster-roaming-request.

In one embodiment, a first network node is adapted to receive, from a second network node, a request indicating a disaster-roaming-request, the serving network name of the Nausf_UEAuthentication_Authenticate Request indicating a network in which a UE is not allowed to roam in a non-disaster condition and authenticate the UE.

In one embodiment, a first network node comprising processing circuitry configured to cause the first network node to receive, from a second network node, a request indicating a disaster-roaming-request, the serving network name of the Nausf_UEAuthentication_Authenticate Request indicating a network in which a UE is not allowed to roam in a non-disaster condition and authenticate the UE.

In one embodiment, a first network node is adapted to receive, from a second network node, a message comprising a first disaster roaming PLMN and an area list including a first PLMN and a first area; and provide the first disaster roaming PLMN and area list to a third network node of a PLMN that serves at least one area in the disaster roaming PLMN and area list.

In one embodiment, a first network node comprising processing circuitry configured to cause the first network node to receive, from a second network node, a message comprising a first disaster roaming PLMN and an area list including a first PLMN and a first area; and provide the first disaster roaming PLMN and area list to a third network node of a PLMN that serves at least one area in the disaster roaming PLMN and area list.

In one embodiment, a first network node is adapted to receive a disaster roaming PLMN and an area list; determine that the first network node serves at least one area of the disaster roaming PLMN and area list; and store a previously stored disaster roaming PLMN and area list to replace a previously stored disaster roaming PLMN and area list.

In one embodiment, a first network node comprising processing circuitry configured to cause the first network node to receive a disaster roaming PLMN and an area list; determine that the first network node serves at least one area of the disaster roaming PLMN and area list; and store a previously stored disaster roaming PLMN and area list to replace a previously stored disaster roaming PLMN and area list.

In one embodiment, a first network node is adapted to receive, from a second network node, a request including a disaster roaming PLMN and area list; determine that the serving network name of the request comprises a network in which a UE is not allowed to roam in a non-disaster condition; determine that the disaster roaming PLMN and area list includes a PLMN ID of a PLMN of the first network node; and authenticate the UE.

In one embodiment, a first network node comprising processing circuitry configured to cause the first network node to receive, from a second network node, a request including a disaster roaming PLMN and area list; determine that the serving network name of the request comprises a network in which a UE is not allowed to roam in a non-disaster condition; determine that the disaster roaming PLMN and area list includes a PLMN ID of a PLMN of the first network node; and authenticate the UE.

In one embodiment, a first network node is adapted to receive a disaster roaming PLMN and area list; remove a previously stored disaster roaming PLMN and area list; and store the received disaster roaming PLMN and area list.

In one embodiment, a first network node comprising processing circuitry configured to cause the first network node to receive a disaster roaming PLMN and area list; remove a previously stored disaster roaming PLMN and area list; and store the received disaster roaming PLMN and area list.

In one embodiment, a first network node is adapted to receive, from a second network node, a request including a disaster PLMN and area list; determine the serving network name of the request comprises a network in which a UE is not allowed to roam in a non-disaster condition; and authenticate the UE.

In one embodiment, a first network node comprising processing circuitry configured to cause the first network node to receive, from a second network node, a request including a disaster PLMN and area list; determine the serving network name of the request comprises a network in which a UE is not allowed to roam in a non-disaster condition; and authenticate the UE.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
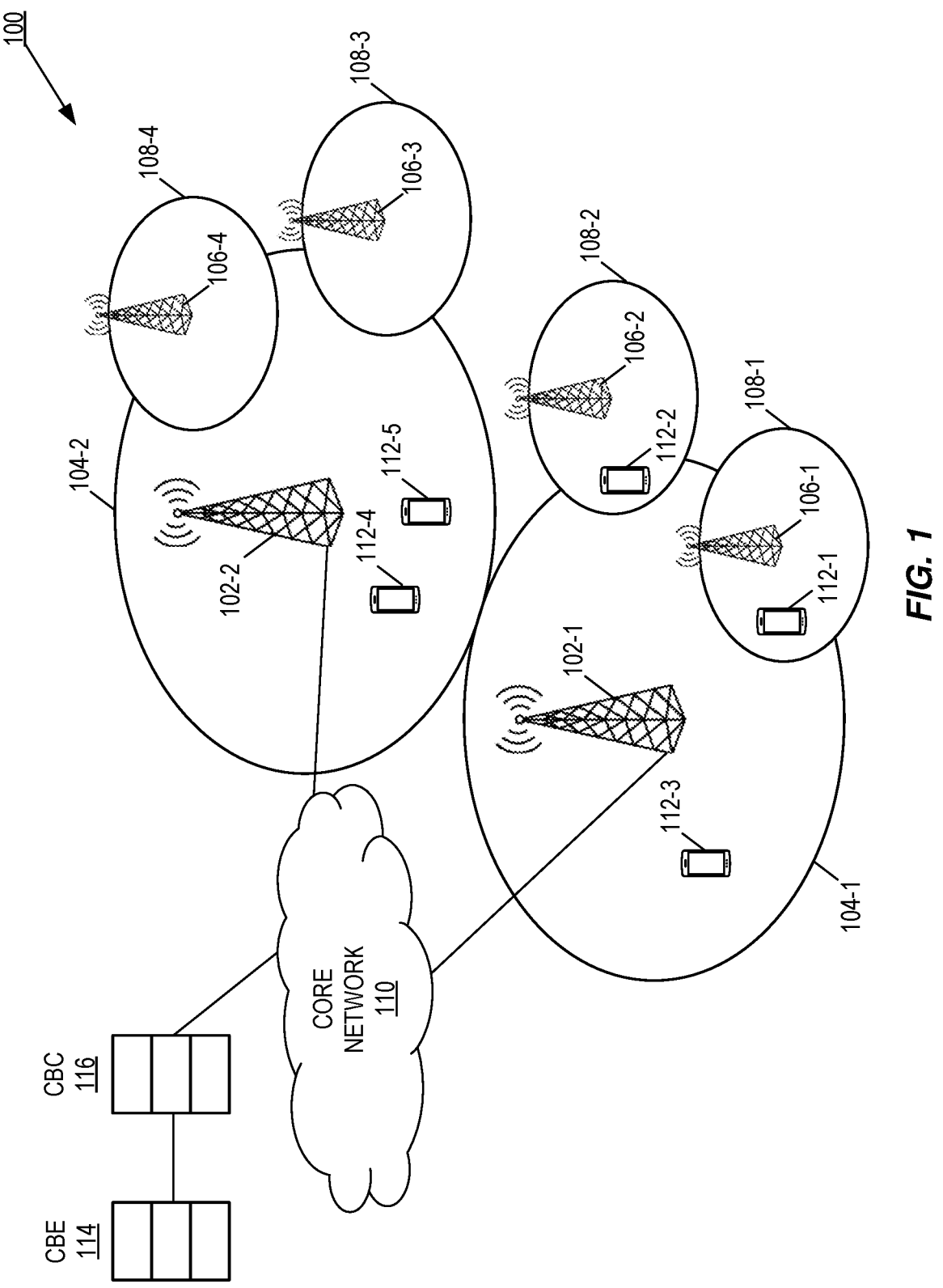
FIG. 1 illustrates one example of a cellular communications system in accordance with the embodiments in the present disclosure.

Certain aspects of the present disclosure and their embodiments may provide solutions to the aforementioned or other challenges. Based on information provided by a Radio Access Network (RAN) or a Cell Broadcasting Entity (CBE), Access and Mobility management Function (AMF) of a first Public Land Mobile Network (PLMN) (e.g. PLMN Y) provides Authentication Server Function (AUSF) of the first PLMN (e.g. PLMN Y) with information enabling the AUSF to authenticate a User Equipment (UE) of a second PLMN (e.g. PLMN X), which may be, e.g. the UE's home PLMN (HPLMN), is in a forbidden serving network and informs the UE when the second PLMN (e.g. PLMN X) of the UE no longer has a disaster condition.

There are, as proposed herein, various embodiments which address one or more of the issues disclosed herein. Certain embodiments may provide one or more of the following technical advantage(s). The AMF and the AUSF in the second PLMN (e.g., PLMN Y) are informed about a UE performing a disaster roaming and the AUSF of the second PLMN (e.g., PLMN Y) performs an authentication of the UE of the first PLMN in a forbidden network (e.g., PLMN X) in case of the disaster roaming. The UE is able to determine quickly that the first PLMN (e.g., PLMN X) no longer has a disaster condition.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, handheld, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a UE in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

FIG. 1 illustrates one example of a cellular communications system 100 in which embodiments of the present disclosure may be implemented. In the embodiments described herein, the cellular communications system 100 is a 5G system (5GS) including a Next Generation RAN (NG-RAN) and a 5G Core (5GC) or an Evolved Packet System (EPS) including an Evolved Universal Terrestrial RAN (E-UTRAN) and an Evolved Packet Core (EPC). In this example, the RAN includes base stations 102-1 and 102-2, which in the 5GS include NR base stations (gNBs) and optionally next generation eNBs (ng-eNBs) (e.g., LTE RAN nodes connected to the 5GC) and in the EPS include, controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5G System (5GS) is referred to as the 5GC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto. The wireless communication devices 112 and the UEs are used interchangeably throughout the present disclosure. Thus, the reference number of the UEs is also 112.

As illustrated in FIG. 1, a Cell Broadcasting Entity (CBE) 114 and a Cell Broadcast Center (CBC) 116 may be connected to the core network 110. When disasters, e.g. earthquake, tsunami, or landslide, may occur, the CBE 114 notifies the CBC 116 of a warning message of the disasters. Then, the CBC 116 forwards the warning message to the core network 110.

Figure 2:
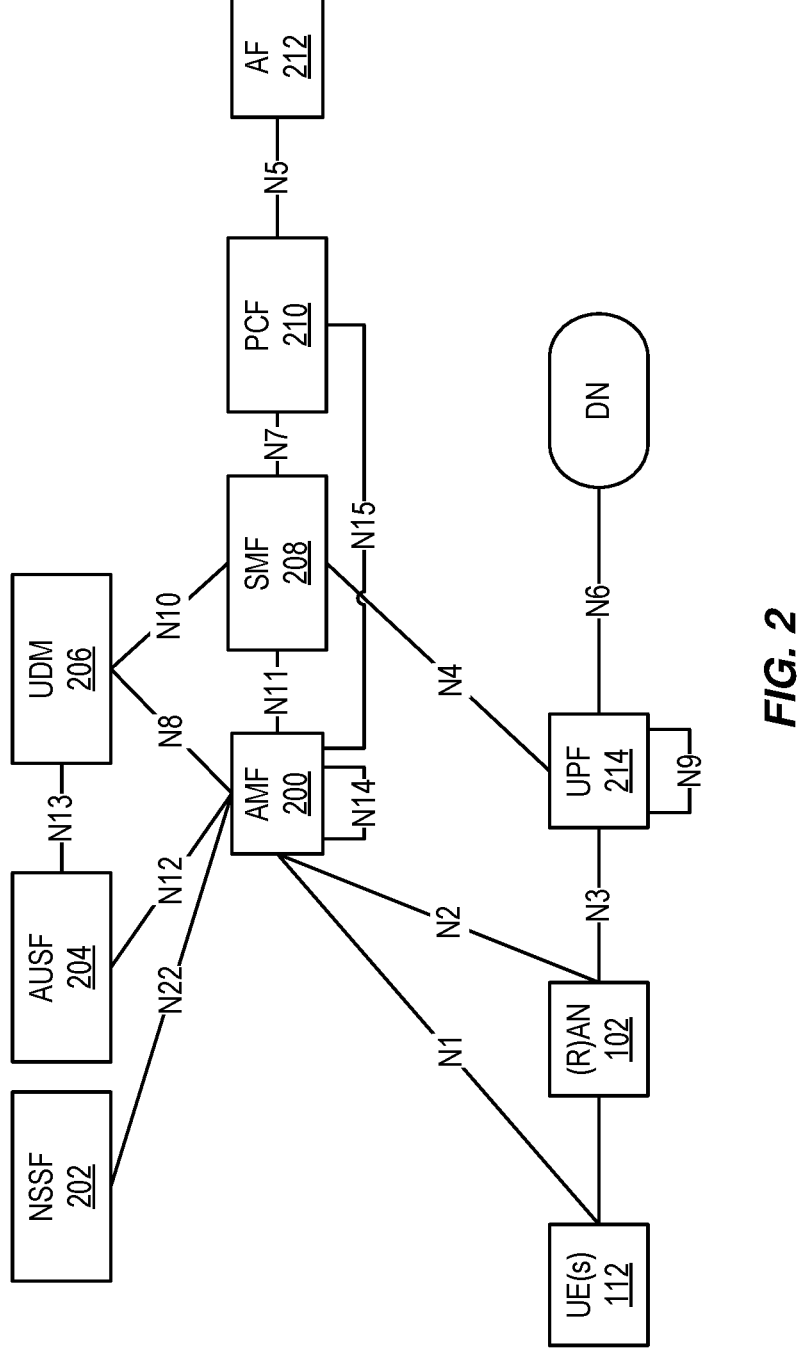
FIG. 2 illustrates a wireless communication system represented as a Fifth Generation (5G) network architecture composed of core Network Functions (NFs), where interaction between any two NFs is represented by a point-to-point reference point/interface.

FIG. 2 illustrates a wireless communication system represented as a 5G network architecture composed of core Network Functions (NFs), where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of UEs 112 connected to either a RAN 102 or an Access Network (AN) as well as an AMF 200. Typically, the R(AN) 102 comprises base stations, e.g. such as eNBs or gNBs or similar. Seen from the core network side, the 5GC NFs shown in FIG. 2 include a NSSF 202, an AUSF 204, a UDM 206, the AMF 200, a SMF 208, a PCF 210, and an Application Function (AF) 212.

Reference point representations of the 5G network architecture are used to develop detailed call flows in the normative standardization. The N1 reference point is defined to carry signaling between the UE 112 and AMF 200. The reference points for connecting between the AN 102 and AMF 200 and between the AN 102 and UPF 214 are defined as N2 and N3, respectively. There is a reference point, N11, between the AMF 200 and SMF 208, which implies that the SMF 208 is at least partly controlled by the AMF 200. N4 is used by the SMF 208 and UPF 214 so that the UPF 214 can be set using the control signal generated by the SMF 208, and the UPF 214 can report its state to the SMF 208. N9 is the reference point for the connection between different UPFs 214, and N14 is the reference point connecting between different AMFs 200, respectively. N15 and N7 are defined since the PCF 210 applies policy to the AMF 200 and SMF 208, respectively. N12 is required for the AMF 200 to perform authentication of the UE 112. N8 and N10 are defined because the subscription data of the UE 112 is required for the AMF 200 and SMF 208.

The 5GC network aims at separating User Plane (UP) and Control Plane (CP). The UP carries user traffic while the CP carries signaling in the network. In FIG. 2, the UPF 214 is in the UP and all other NFs, i.e., the AMF 200, SMF 208, PCF 210, AF 212, NSSF 202, AUSF 204, and UDM 206, are in the CP. Separating the UP and CP guarantees each plane resource to be scaled independently. It also allows UPFs to be deployed separately from CP functions in a distributed fashion. In this architecture, UPFs may be deployed very close to UEs 112 to shorten the Round Trip Time (RTT) between the UEs 112 and data network for some applications requiring low latency.

The core 5G network architecture is composed of modularized functions. For example, the AMF 200 and SMF 208 are independent functions in the CP. Separated AMF 200 and SMF 208 allow independent evolution and scaling. Other CP functions like the PCF 210 and AUSF 204 can be separated as shown in FIG. 2. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 3:
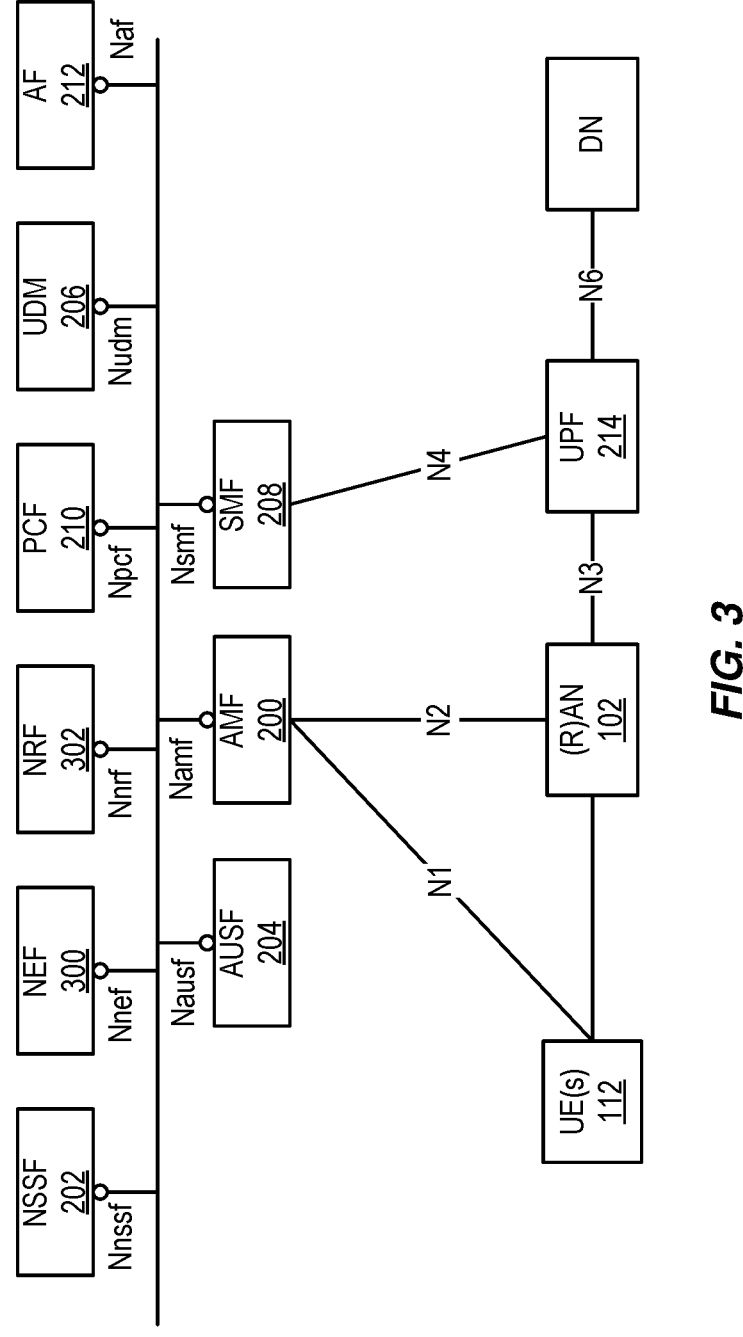
FIG. 3 illustrates a 5G network architecture using service-based interfaces between the NFs in the Control Panel (CP).

FIG. 3 illustrates a 5G network architecture using service-based interfaces between the NFs in the CP, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF 200 and Nsmf for the service based interface of the SMF 208, etc. The NEF 300 and the NRF 302 in FIG. 3 are not shown in FIG. 2 discussed above. However, it should be clarified that all NFs depicted in FIG. 2 can interact with the NEF 300 and the NRF 302 of FIG. 3 as necessary, though not explicitly indicated in FIG. 2.

Some properties of the NFs shown in FIGS. 2 and 3 may be described in the following manner. The AMF 200 provides UE-based authentication, authorization, mobility management, etc. A UE 112 even using multiple access technologies is basically connected to a single AMF 200 because the AMF 200 is independent of the access technologies. The SMF 208 is responsible for session management and allocates Internet Protocol (IP) addresses to UEs. It also selects and controls the UPF 214 for data transfer. If a UE 112 has multiple sessions, different SMFs 208 may be allocated to each session to manage them individually and possibly provide different functionalities per session. The AF 212 provides information on the packet flow to the PCF 210 responsible for policy control in order to support Quality of Service (QoS). Based on the information, the PCF 210 determines policies about mobility and session management to make the AMF 200 and SMF 208 operate properly. The AUSF 204 supports authentication function for the UEs 112 or similar and thus stores data for authentication of the UEs 112 or similar while the UDM 206 stores subscription data of the UE 112. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

FIGS. 4-7 relate to example embodiments of Alternatives 1-4, respectively, described herein. The AUSF 204 of a PLMN Y is configured to authenticate the UE 112 (of a PLMN X) in the PLMN Y, which is a forbidden serving network to the UE 112, based on information provided to the AUSF 204 by the AMF 200 of the PLMN Y. Such information is provided to the AMF 200 by the RAN node 102 or the CBE 114. The method further comprises that the AUSF 204 of the PLMN Y informs the UE 112 when the PLMN X no longer has a disaster condition.

Alternative 1

Figure 4:
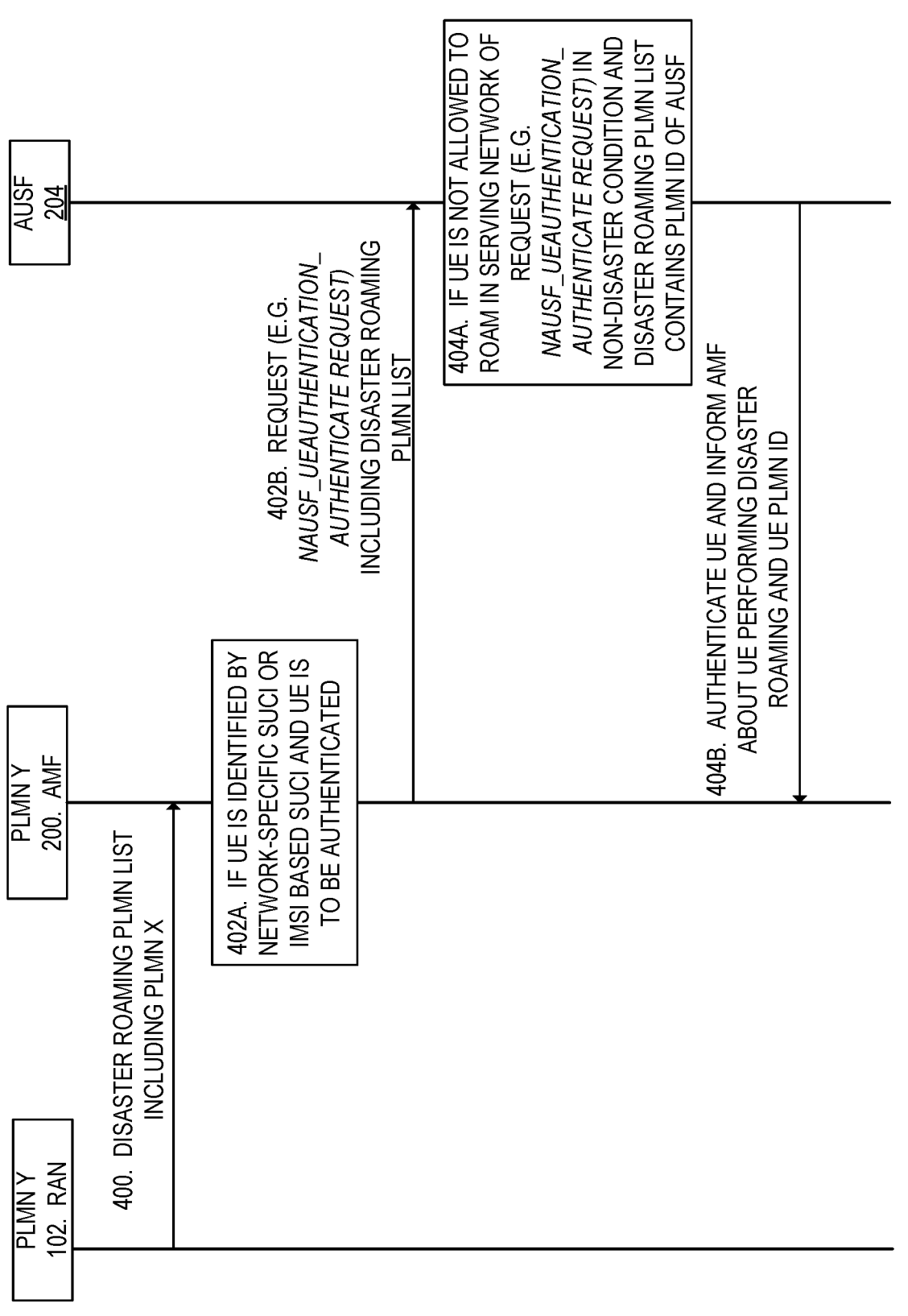
FIG. 4 illustrates Alternative 1 of the present disclosure.

In FIG. 4, it is assumed that a RAN node 102 (e.g., gNodeB) in an area of the PLMN Y is configured with a "disaster roaming PLMN list," which is listing PLMN IDs of PLMNs with a disaster condition in the area served by the RAN node 102. In one embodiment, the configuration is done using operation-and-maintenance mechanisms by personnel of the PLMN Y, based on information provided by the PLMN X with a disaster condition and based on a decision to enable the disaster roaming for UEs 112 of a HPLMN X in the PLMN Y. In one embodiment, the method of Alternative 1 includes the following steps:

Step 400: the RAN node 102 of the PLMN Y informs the AMF 200 of the PLMN Y about a "disaster roaming PLMN list" of the RAN node 102. In one embodiment, the RAN node 102 sends the "disaster roaming PLMN list" to the AMF 200 in an N2 INITIAL UE MESSAGE and whenever the "disaster roaming PLMN list" changes during the N2 signaling connection.

Step 402 (402A and 402B): if the RAN node 102 serving the UE 112 provides the "disaster roaming PLMN list," the UE 112 is identified by (a) a network-specific identifier based Subscription Concealed Identifier (SUCI) or (b) International Mobile Subscriber Identity (IMSI) based SUCI, and the UE 112 is to be authenticated (step 402A), then the AMF 200 includes the "disaster roaming PLMN list" in a request (e.g. Nausf_UEAuthentication_Authenticate Request) sent towards the AUSF 204 (step 402B).

Step 404 (404A and 404B): If the AUSF 204 receives the request (e.g. Nausf_UEAuthentication_Authenticate Request) with the "disaster roaming PLMN list," the serving network name of the request (e.g. Nausf_UEAuthentication_Authenticate Request) indicates a particular network (PLMN) in which the UE 112 is not allowed to roam in non-disaster conditions, and the "disaster roaming PLMN list" contains the PLMN ID of the particular network (PLMN) of the AUSF 204 (step 404A), the AUSF 204 will authenticate the UE 112 (rather than rejecting the authentication) (step 404B). In one embodiment, optionally, if the authentication is successful, the AUSF 204 informs the AMF 200 about the UE 112 performing the disaster roaming and provides the AMF 200 with the PLMN ID of HPLMN of the UE 112.

In one embodiment, if the AMF 200 is informed that the UE 112 performs the disaster roaming, the RAN node 102 serving the UE 112 provides a changed "disaster roaming PLMN list" that no longer indicates the PLMN ID of HPLMN of the UE 112, then the AMF 200 triggers the UE 112 to perform a PLMN selection.

In one embodiment, if the UE 112 is in the 5GMM-CONNECTED mode, the AMF 200 either performs a UE configuration update procedure with an indication that a disaster condition in HPLMN was resolved or triggers the UE 112 to perform a mobility registration update and rejects the mobility registration update with an indication that the disaster condition in HPLMN was resolved (e.g., a new 5GMM cause #YYY "disaster condition in HPLMN resolved"). That indication will trigger the UE 112 to clear the determination that the HPLMN's core network is impacted by a disaster, to enter the state 5GMM-REGISTERED.PLMN-SEARCH and to perform the PLMN selection.

In one embodiment, if the UE 112 in the 5GMM-IDLE mode attempts to move to the 5GMM-CONNECTED mode, the AMF 200 rejects an initial Non-Access Stratum (NAS) request with an indication that the disaster condition in HPLMN was resolved (e.g., 5GMM cause #YYY "disaster condition in HPLMN resolved"). This will trigger the UE 112 to clear the determination that the HPLMN's core network is impacted by the disaster, to enter the state 5GMM-REGISTERED.PLMN-SEARCH, and to perform PLMN selection.

Alternative 2

Figure 5:
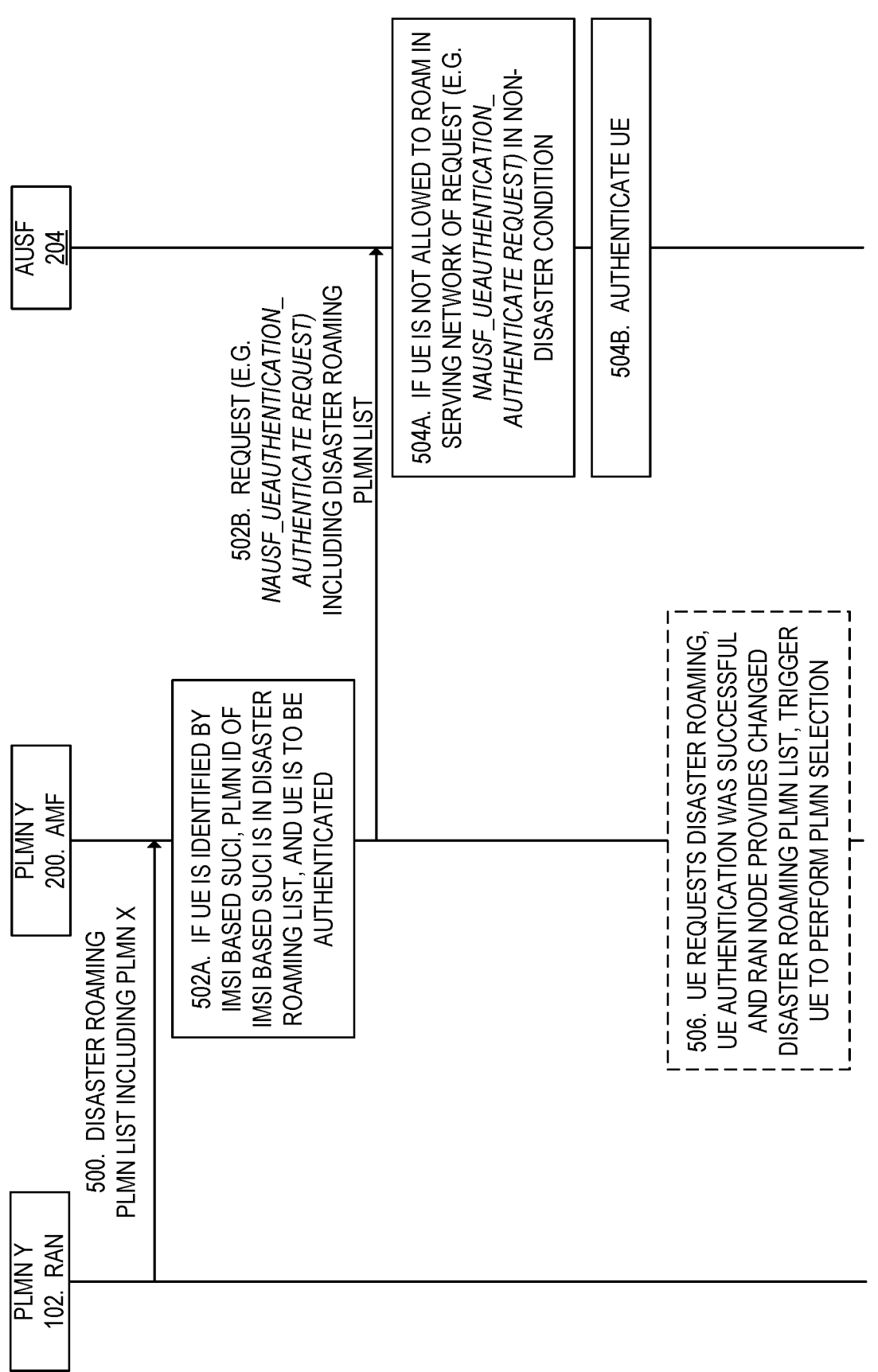
FIG. 5 illustrates Alternative 2 of the present disclosure.

The example embodiment of FIG. 5 illustrates this alternative. In this alternative it is assumed that the RAN node 102 (e.g., gNodeB) in an area of the PLMN Y is configured with the "disaster roaming PLMN list" that is listing PLMN IDs of PLMNs with disaster conditions in the area served by the RAN node 102. In one embodiment, the configuration is done using operation-and-maintenance mechanisms by personnel of the PLMN Y based on information provided by the PLMN X with a disaster condition and based on a decision to enable the disaster roaming for UEs 112 of the HPLMN X in the PLMN Y. In one embodiment, the method of Alternative 2 includes the following steps:

Step 500: the RAN node 102 of the PLMN Y informs the AMF 200 of the PLMN Y about its "disaster roaming PLMN list." In one embodiment, the RAN node 102 informs the AMF 200 in a "N2 INITIAL UE MESSAGE" and whenever the "disaster roaming PLMN list" changes during the duration of the N2 signaling connection.

Step 502: if (a) the RAN node 102 serving the UE 112 provides the "disaster roaming PLMN list," (b) the UE 112 is identified by IMSI based SUCI, (c) the PLMN ID of the IMSI based SUCI is in the "disaster roaming PLMN list" received from RAN, and (d) the UE 112 is to be authenticated (step 502A), then the AMF 200 considers that the UE 112 requests the disaster roaming and includes the "disaster-roaming-request" indication in the request (e.g. Nausf_UEAuthentication_Authenticate Request) sent towards the AUSF 204 (step 502B).

Step 504: If the AUSF 204 receives the request (e.g., Nausf_UEAuthentication_Authenticate Request) with the "disaster-roaming-request" indication, the serving network name of the request (e.g., Nausf_UEAuthentication_Authenticate Request) indicates a network in which the UE is not allowed to roam in the non-disaster condition (step 504A), the AUSF 204 will authenticate the UE 112 (rather than rejecting the authentication) (step 504B).

Step 506: Optionally, if the AMF 200 considered that the UE 112 requests a disaster roaming, the authentication of the UE 112 was successful, and the RAN node 102 serving the UE 112 provides a changed "disaster roaming PLMN list," which no longer indicates the PLMN ID of HPLMN of the UE 112, then the AMF 200 triggers the UE 112 to perform a PLMN selection.

In one embodiment, if the UE 112 is in the 5GMM-CONNECTED mode, the AMF 200 either performs a UE configuration update procedure with an indication that a disaster condition in HPLMN was resolved or triggers the UE 112 to perform a mobility registration update and rejects the mobility registration update with an indication that the disaster condition in HPLMN was resolved (e.g., a new 5GMM cause #YYY "disaster condition in HPLMN resolved"). The indication will trigger the UE 112 to clear the determination that the HPLMN's core network is impacted by the disaster, to enter the state 5GMM-REGISTERED.PLMN-SEARCH, and to perform a PLMN selection.

In one embodiment, if the UE 112 in the 5GMM-IDLE mode attempts to move to the 5GMM-CONNECTED mode, the AMF 200 rejects the initial NAS request with an indication that the disaster condition in HPLMN was resolved (e.g., 5GMM cause #YYY "disaster condition in HPLMN resolved"), which will trigger the UE 112 to clear the determination that the HPLMN's core network is impacted by the disaster, to enter the state 5GMM-REGISTERED.PLMN-SEARCH, and to perform the PLMN selection.

Alternative 3

Figure 6:
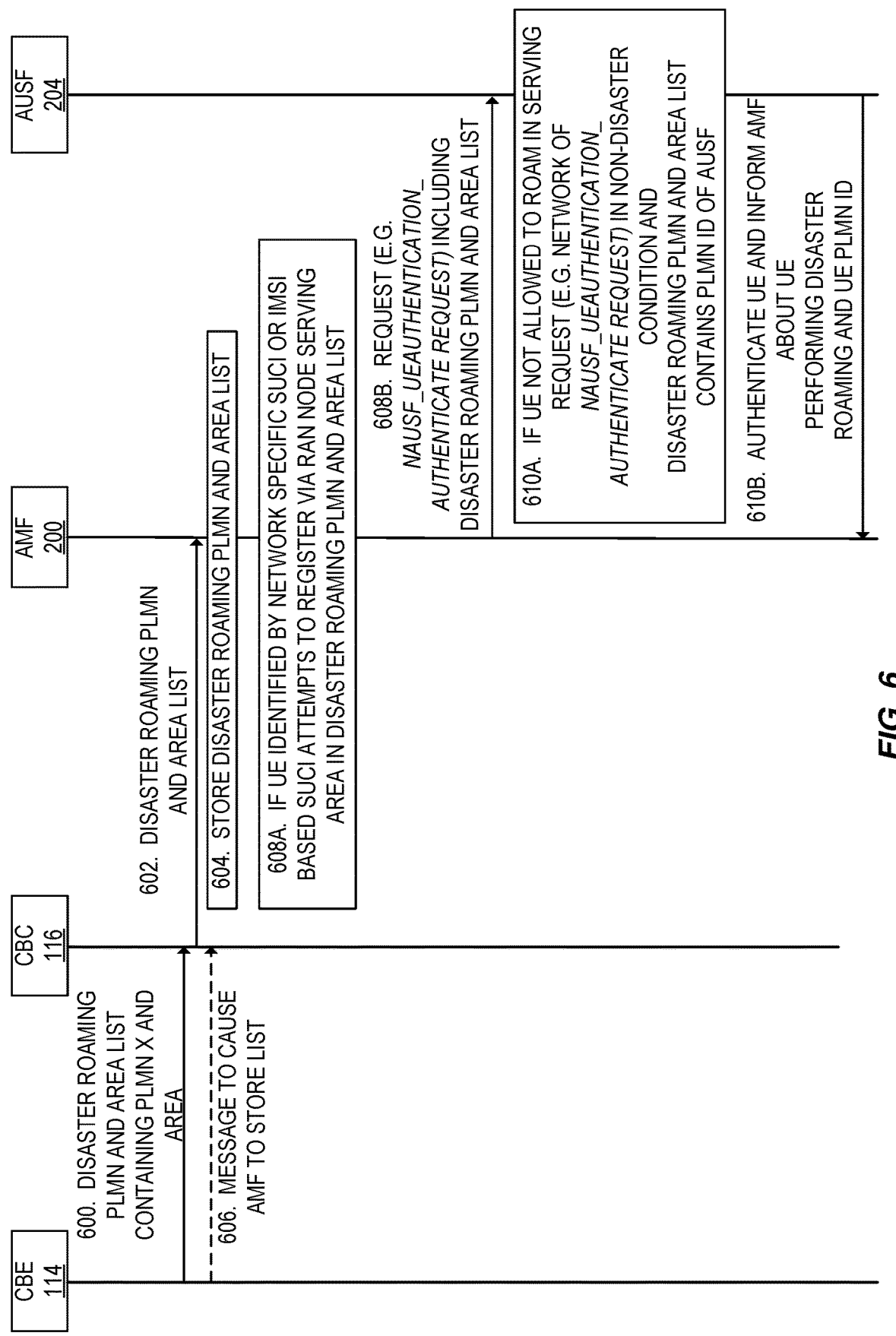
FIG. 6 illustrates Alternative 3 of the present disclosure.

The example embodiment of FIG. 6 illustrates this alternative. In one embodiment, this alternative assumes that CBE 114 is configured with "disaster roaming PLMN and area list," that is listing PLMN IDs of PLMNs with disaster conditions in an area. The configuration is done by the CBE 114 based on information provided by PLMN(s) with disaster conditions. In one embodiment, the method of Alternative 3 includes the following steps:

Step 600: When the CBE 114 personnel is informed that an area of the PLMN X has a disaster condition and the CBE 114 personnel decides that the UEs 112 of the HPLMN X are to be provided with the disaster roaming in the PLMN Y, the CBE 114 provides the CBC 116 with a message with a (updated) "disaster roaming PLMN and area list" containing the PLMN X and the area having the disaster condition. In one embodiment, if the CBE 114 provided a "disaster roaming PLMN and area list" previously to the CBC 116, the CBE 114 indicates the previous "disaster roaming PLMN and area list" in the same message.

Step 602: Upon receiving the message including the "disaster roaming PLMN and area list," the CBC 116 provides the (updated) "disaster roaming PLMN and area list" to the AMF 200 of the PLMN Y, which serves at least one area in the (updated) "disaster roaming PLMN and area list" or in the previous "disaster roaming PLMN and area list."

Step 604: When the AMF 200 receives the (updated) "disaster roaming PLMN and area list" from the CBC 116, the AMF 200 removes a previously stored "disaster roaming PLMN and area list", if any, and if the AMF 200 serves at least one area of the (updated) "disaster roaming PLMN and area list" provided by the CBC 116, the AMF 200 stores the (updated) "disaster roaming PLMN and area list."

Step 606: In one embodiment, optionally, the CBE 114 sends the CBC 116 a message causing the AMF 200 to store the (updated) "disaster roaming PLMN and area list."

When the CBE 114 is informed that the PLMN X in the area does not have a disaster condition any more, the CBE 114 provides to the CBC 116 a message with the updated "disaster roaming PLMN and area list" NOT containing the PLMN X, the area, and the previous "disaster roaming PLMN and area list." Upon receiving the message, the CBC 116 provides the updated "disaster roaming PLMN and area list" to the AMF 200 of the PLMN Y, which serves at least one area in the updated "disaster roaming PLMN and area list" or the previous "disaster roaming PLMN and area list."

When the AMF 200 receives the updated "disaster roaming PLMN and area list" from the CBC 116, the AMF 200 removes the stored "disaster roaming PLMN and area list," if any, and if the AMF 200 serves at least one area of the updated "disaster roaming PLMN and area list" provided by the CBC 116, the AMF 200 stores the updated "disaster roaming PLMN and area list."

Step 608 (608A and 608B): If the AMF 200 has stored "disaster roaming PLMN and area list" and the UE 112 identified by network-specific identifier based SUCI or IMSI based SUCI attempts to register via a RAN node 102 (e.g. gNodeB) serving an area indicated in the "disaster roaming PLMN and area list," and the UE 112 is to be authenticated (step 608A), then the AMF 200 includes the "disaster roaming PLMN and area list" in the request (e.g. Nausf_UEAuthentication_Authenticate Request) sent towards the AUSF 204 (step 608B). The "disaster roaming PLMN and area list" contains all PLMNs for which the disaster roaming is possible in the area served by the RAN node 102 serving the UE 112.

Step 610: If the AUSF 204 receives the request (e.g. Nausf_UEAuthentication_Authenticate Request) with the "disaster roaming PLMN and area list," the serving network name of the request (e.g. Nausf_UEAuthentication_Authenticate Request) indicates a network in which the UE 112 is not allowed to roam in non-disaster conditions and the "disaster roaming PLMN and area list" contains the PLMN ID of the PLMN of the AUSF 204 (step 610A), the AUSF 204 will authenticate the UE 112 (rather than rejecting the authentication) and, if the authentication is successful, the AUSF 204 informs the AMF 200 about the UE 112 performing the disaster roaming and provides the AMF 200 with PLMN ID of HPLMN of the UE 112 (step 610B).

In one embodiment, if the AMF 200 was informed that the UE 112 performs the disaster roaming, and AMF's stored "disaster roaming PLMN and area list" no longer indicates the PLMN ID of HPLMN of the UE 112 and the area served by the RAN node 102 serving the UE 112, the AMF 200 triggers the UE 112 to perform a PLMN selection.

In one embodiment, if the UE 112 is in the 5GMM-CONNECTED mode, the AMF 200 either performs the UE configuration update procedure with an indication that a disaster condition in HPLMN was resolved or triggers the UE 112 to perform the mobility registration update and rejects the mobility registration update with an indication that the disaster condition in HPLMN was resolved (e.g., a new 5GMM cause #YYY "disaster condition in HPLMN resolved"). The indication will trigger the UE 112 to clear the determination that the HPLMN's core network is impacted by the disaster, to enter the state 5GMM-REGISTERED.PLMN-SEARCH, and to perform the PLMN selection.

In one embodiment, if the UE 112 in the 5GMM-IDLE mode attempts to move to 5GMM-CONNECTED mode, the AMF 200 rejects the initial NAS request with an indication that the disaster condition in HPLMN was resolved (e.g., 5GMM cause #YYY "disaster condition in HPLMN resolved"). This will trigger the UE 112 to clear the determination that the HPLMN's core network is impacted by the disaster, to enter the state 5GMM-REGISTERED.PLMN-SEARCH, and to perform the PLMN selection.

Alternative 4

Figure 7:
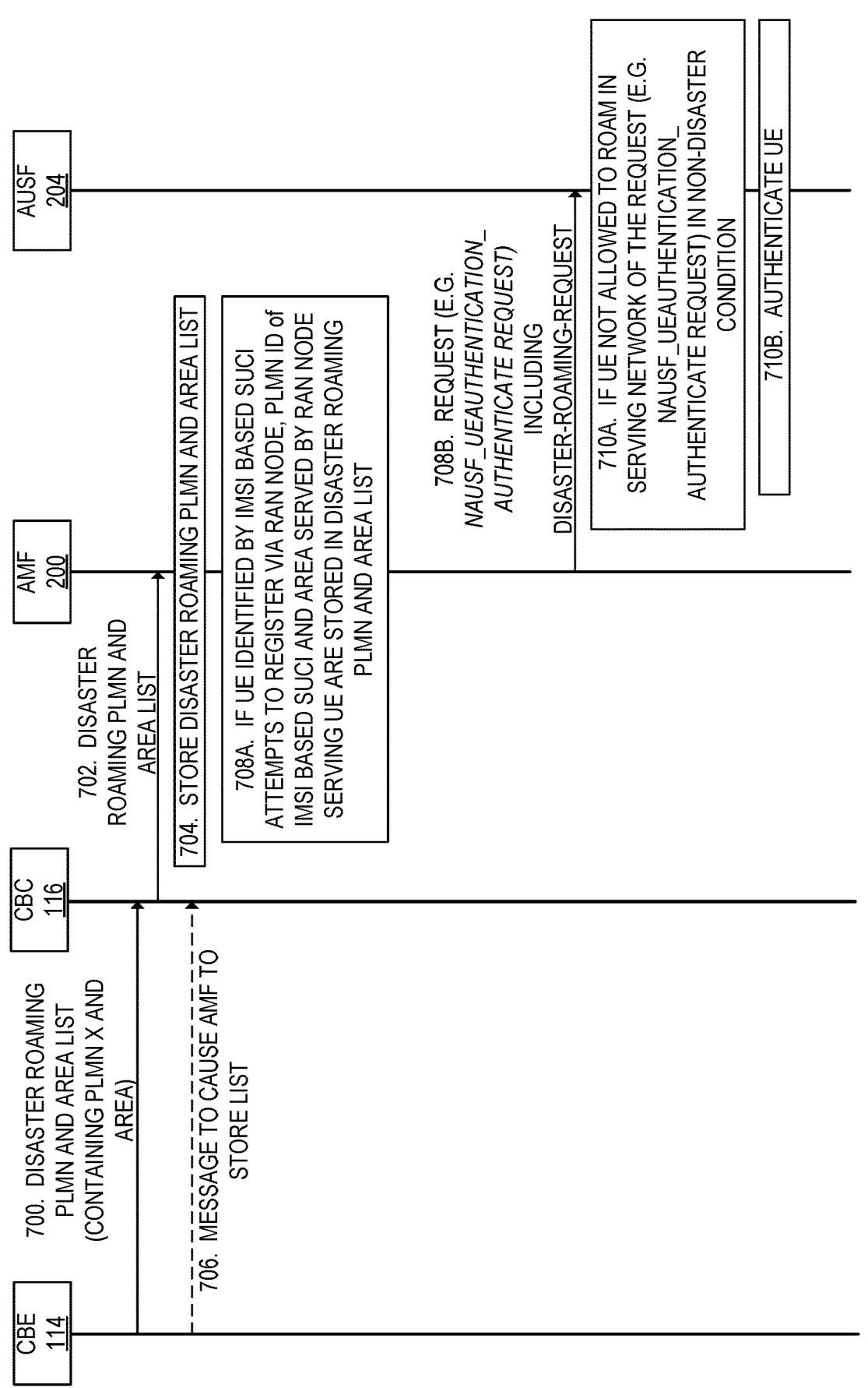
FIG. 7 illustrates Alternative 4 of the present disclosure.

The example embodiment of FIG. 7 illustrates this alternative. In this alternative, it is assumed that the CBE 114 is configured with the "disaster roaming PLMN and area list" that is listing PLMN IDs of PLMNs with a disaster condition in an area. The configuration is done by the CBE 114 based on information provided by personnel of PLMN(s) with the disaster condition. In one embodiment, the method of Alternative 4 includes the following steps:

Step 700: When the CBE 114 is informed that the PLMN X in an area has a disaster condition and the CBE 114 decides that the UEs 112 of the HPLMN X are provided with the disaster roaming in the PLMN Y, the CBE 114 provides the CBC 116 with a message with a (updated) "disaster roaming PLMN and area list" containing the PLMN X and the area. If the CBE 114 provided a "disaster roaming PLMN and area list" previously, the CBE 114 indicates the previous "disaster roaming PLMN and area list" in the same message.

Step 702: Upon receiving the message, the CBC 116 provides the (updated) "disaster roaming PLMN and area list" to the AMF 200 of the PLMN Y that serves at least one area in the (updated) "disaster roaming PLMN and area list" or the previous "disaster roaming PLMN and area list."

Step 704: When the AMF 200 receives the (updated) "disaster roaming PLMN and area list" from the CBC 116, the AMF 200 removes the stored "disaster roaming PLMN and area list," if any, and if the AMF 200 serves at least one area of the (updated) "disaster roaming PLMN and area list" provided by the CBC 116, the AMF 200 stores the (updated) "disaster roaming PLMN and area list."

Step 706: Optionally, in one embodiment, the CBE 114 sends to the CBC 116 a message causing the AMF 200 to store an updated disaster roaming PLMN and area list.

When the CBE 114 is informed that the PLMN X in an area does not have the disaster condition anymore, the CBE 114 provides to the CBC 116 a message with an updated "disaster roaming PLMN and area list" NOT containing the PLMN X and the area and the previous "disaster roaming PLMN and area list."

Upon receiving the message, the CBC 116 provides the updated "disaster roaming PLMN and area list" to the AMF 200 of the PLMN Y that serves at least one area in the updated "disaster roaming PLMN and area list" or the previous "disaster roaming PLMN and area list."

When the AMF 200 receives the updated "disaster roaming PLMN and area list" from the CBC 116, the AMF 200 removes the stored "disaster roaming PLMN and area list," if any, and if the AMF 200 serves at least one area of the updated "disaster roaming PLMN and area list" provided by the CBC 116, the AMF 200 stores the updated "disaster roaming PLMN and area list."

Step 708: If the AMF 200 has stored "disaster roaming PLMN and area list," the UE 112 identified by IMSI based SUCI attempts to register via the RAN node 102 (e.g. gNodeB), and the PLMN ID of the IMSI based SUCI and the area served by the RAN node serving the UE are in the stored "disaster roaming PLMN and area list," and the UE 112 is to be authenticated (step 708A), then the AMF 200 considers that the UE 112 requests the disaster roaming and includes the "disaster-roaming-request" indication in the request (e.g. Nausf_UEAuthentication_Authenticate Request) sent towards the AUSF 204 (step 708B).

Step 710: If the AUSF 204 receives the request (e.g., Nausf_UEAuthentication_Authenticate Request) with the "disaster-roaming-request" indication, the serving network name of the request (e.g., Nausf_UEAuthentication_Authenticate Request) indicates a network in which the UE 112 is not allowed to roam in non-disaster conditions (step 710A), the AUSF 204 will authenticate the UE 112 (rather than rejecting the authentication) (step 710B).

In one embodiment, if the AMF 200 considered that the UE 112 requested the disaster roaming, the authentication of the UE 112 was successful and AMF's stored "disaster roaming PLMN and area list" no longer indicates the PLMN ID of HPLMN of the UE 112 and the area served by the RAN node.

In one embodiment, if the UE 112 is in the 5GMM-CONNECTED mode, the AMF 200 either performs the UE configuration update procedure with an indication that the disaster condition in HPLMN was resolved or triggers the UE 112 to perform the mobility registration update and rejects the mobility registration update with an indication that the disaster condition in HPLMN was resolved (e.g., a new 5GMM cause #YYY "disaster condition in HPLMN resolved"). The indication will trigger the UE 112 to clear the determination that the HPLMN's core network is impacted by the disaster, to enter the state 5GMM-REGIS-TERED.PLMN-SEARCH, and to perform the PLMN selection.

In one embodiment, if the UE 112 in the 5GMM-IDLE mode attempts to move to 5GMM-CONNECTED mode, the AMF 200 rejects the initial NAS request with an indication that the disaster condition in HPLMN was resolved (e.g., 5GMM cause #YYY "disaster condition in HPLMN resolved"). This will trigger the UE 112 to clear the determination that the HPLMN's core network is impacted by the disaster, to enter the state 5GMM-REGISTERED.PLMN-SEARCH, and to perform a PLMN selection.

Additional Description

Figure 8:
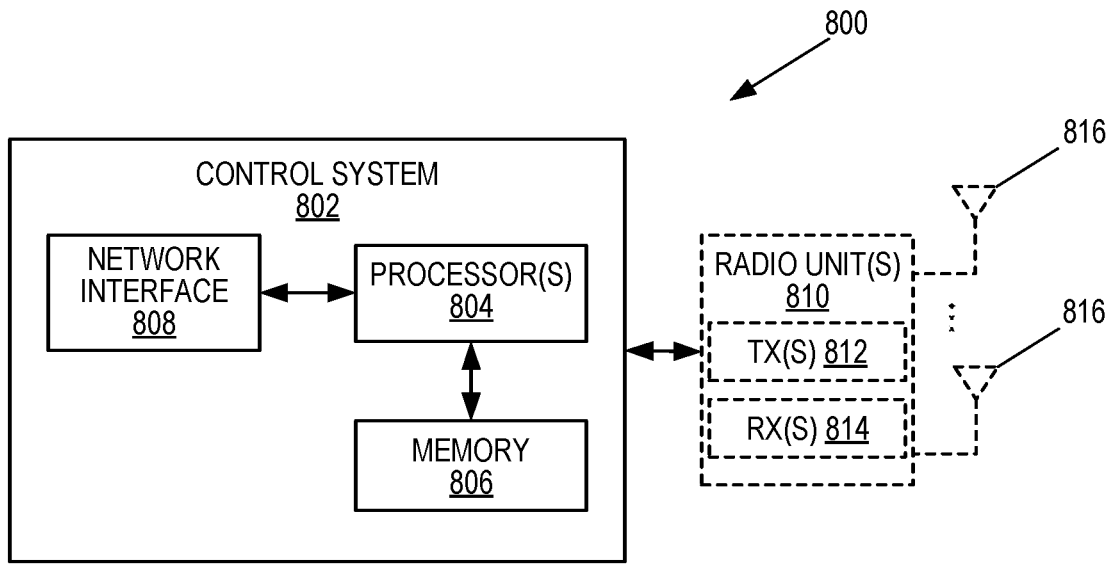
FIG. 8 illustrates a schematic block diagram of a network node according to some embodiments of the present disclosure.

FIG. 8 is a schematic block diagram of a network node 800 according to some embodiments of the present disclosure. Optional features are represented by dashed boxes. The network node 800 may be, for example, a RAN node (also referred to herein as a radio access node) such as e.g., a base station 102 or 106 or a network node that implements all or part of the functionality of the base station 102 described herein or a network node that performs the functionality of some other network entity (e.g., the CBE 114 or the CBC 116) as described herein. As illustrated, the network node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, if the network node 800 is a radio access node, the network node 800 may include one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of the network node 800 as described herein (e.g., one or more functions of a RAN node or other network entity such as, e.g., the CBE 114 or the CBC 116 as described herein). In some embodiments, the function(s) are implemented in software that is stored, e.g., in the memory 806 and executed by the one or more processors 804.

Figure 9:
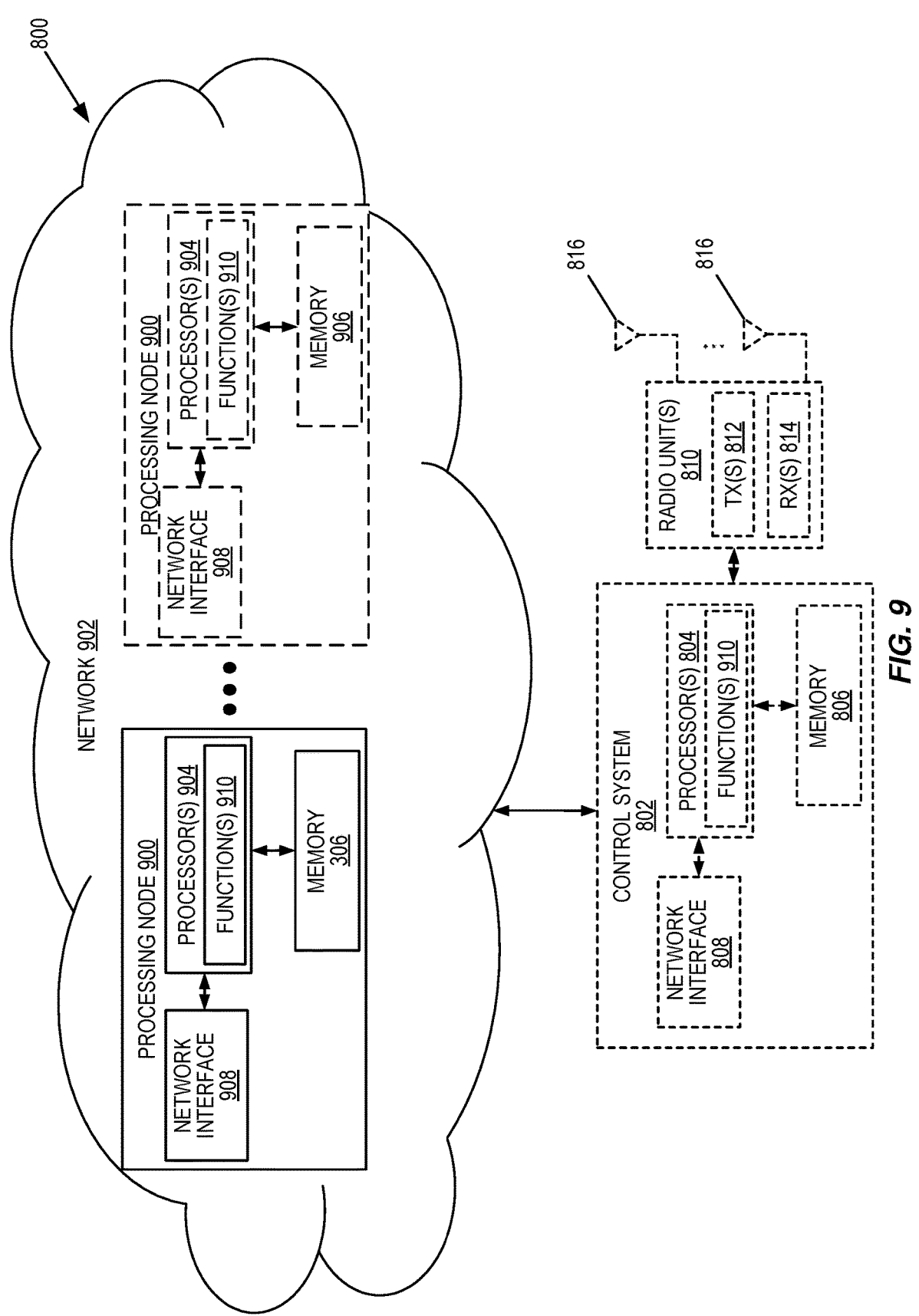
FIG. 9 illustrates a schematic block diagram that illustrates a virtualized embodiment of a network node according to some embodiments of the present disclosure.

FIG. 9 is a schematic block diagram that illustrates a virtualized embodiment of the network access node 800 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the network access node 800 in which at least a portion of the functionality of the network access node 800 is implemented as a virtual component(s) (e.g., via a virtual machine(s) executing on a physical processing node(s) in a network(s)). As illustrated, in this example, the network access node 800 may include the control system 802 and/or the one or more radio units 810, as described above. The control system 802 may be connected to the radio unit(s) 810 via, for example, an optical cable or the like. The network access node 800 includes one or more processing nodes 9900 coupled to or included as part of a network(s) 9902. If present, the control system 802 or the radio unit(s) are connected to the processing node(s) 9900 via the network 9902. Each processing node 9900 includes one or more processors 9904 (e.g., CPUs, ASICs, FPGAs, and/or the like), memory 906, and a network interface 908.

In this example, functions 910 of the network access node 800 described herein are implemented at the one or more processing nodes 900 or distributed across the one or more processing nodes 900 and the control system 802 and/or the radio unit(s) 810 in any desired manner. In some particular embodiments, some or all of the functions 910 of the network access node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of network access node 800 or a node (e.g., a processing node 900) implementing one or more of the functions 910 of the network access node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
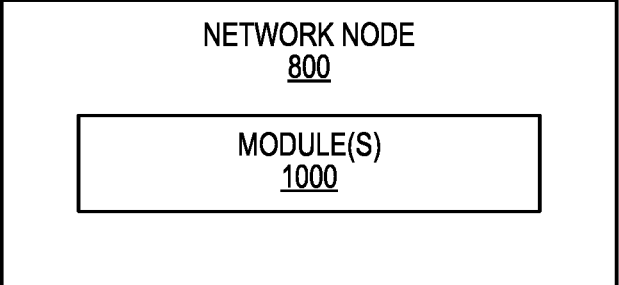
FIG. 10 illustrates a schematic block diagram of a network node according to some embodiments of the present disclosure.

FIG. 10 is a schematic block diagram of the network access node 800 according to some other embodiments of the present disclosure. The network access node 800 includes one or more modules 1000, each of which is implemented in software. The module(s) 1000 provide the functionality of the network access node 800 described herein. This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Figure 11:
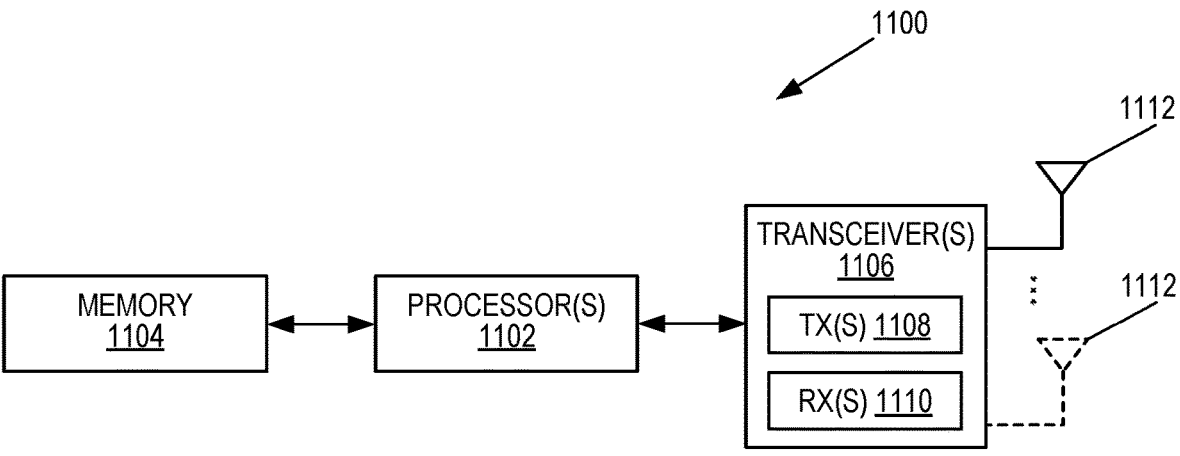
FIG. 11 illustrates a schematic block diagram of a wireless communication device according to some embodiments of the present disclosure.

FIG. 11 is a schematic block diagram of a wireless communication device 1100 according to some embodiments of the present disclosure. The wireless communication device 1100 may be, e.g., the wireless communication device 112 or the UE 112 described above. As illustrated, the wireless communication device 1100 includes one or more processors 1102 (e.g., CPUs, ASICs, FPGAs, and/or the like), memory 1104, and one or more transceivers 1106 each including one or more transmitters 1108 and one or more receivers 1110 coupled to one or more antennas 1112. The transceiver(s) 1106 includes radio-front end circuitry connected to the antenna(s) 1112 that is configured to condition signals communicated between the antenna(s) 1112 and the processor(s) 1102, as will be appreciated by on of ordinary skill in the art. The processors 1102 are also referred to herein as processing circuitry. The transceivers 1106 are also referred to herein as radio circuitry. In some embodiments, the functionality of the wireless communication device 1100 described above (e.g., one or more functions of the wireless communication device 112 or the UE 112 described above)

may be fully or partially implemented in software that is, e.g., stored in the memory 1104 and executed by the processor(s) 1102. Note that the wireless communication device 1100 may include additional components not illustrated in FIG. 11 such as, e.g., one or more user interface components (e.g., an input/output interface including a display, buttons, a touch screen, a microphone, a speaker(s), and/or the like and/or any other components for allowing input of information into the wireless communication device 1100 and/or allowing output of information from the wireless communication device 1100), a power supply (e.g., a battery and associated power circuitry), etc.

In some embodiments, a computer program including instructions which, when executed by at least one processor, causes the at least one processor to carry out the functionality of the wireless communication device 1100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
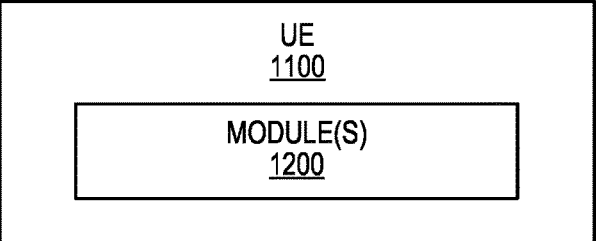
FIG. 12 illustrates a schematic block diagram of the wireless communication device according to some embodiments of the present disclosure.

FIG. 12 is a schematic block diagram of the wireless communication device 1100 according to some other embodiments of the present disclosure. The wireless communication device 1100 includes one or more modules 1200, each of which is implemented in software. The module(s) 1200 provide the functionality of the wireless communication device 1100 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GMM Fifth Generation System Mobility Management
5GS Fifth Generation System AF Application Function
AMF Access and Mobility Function
AN Access Network
ASIC Application Specific Integrated Circuit
AUSF Authentication Server Function
CBC Cell Broadcast Center
CBE Cell Broadcasting Entity
CP Control Plane
CPU Central Processing Unit
DN Data Network
DSP Digital Signal Processor
eNB Enhanced or Evolved Node B
EPC Evolved Packet Core
EPS Evolved Packet System
E-UTRA Evolved Universal Terrestrial Radio Access
FPGA Field Programmable Gate Array
gNB New Radio Base Station
gNB-CU New Radio Base Station Central Unit
gNB-DU New Radio Base Station Distributed Unit
HPLMN Home Public Land Mobile Network
HSS Home Subscriber Server
IMSI International Mobile Subscriber Identity
IoT Internet of Things
IP Internet Protocol
LTE Long Term Evolution
MME Mobility Management Entity
MTC Machine Type Communication
NAS Non-Access Stratum
NEF Network Exposure Function
NF Network Function
NR New Radio
NRF Network Function Repository Function
NSSF Network Slice Selection Function
PC Personal Computer
PCF Policy Control Function
P-GW Packet Data Network Gateway
PLMN Public Land Mobile Network
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
SUCI Subscription Concealed Identifier
UDM Unified Data Management
UE User Equipment
UP User Plane
UPF User Plane Function Those skilled in the art will recognize improvements and modifications to the embodiments of the present disclosure. All such improvements and modifications are considered within the scope of the concepts disclosed herein.

The invention claimed is:

1. A method performed by a first network node, the method comprising: obtaining a first disaster roaming Public Land Mobile Network, PLMN, list from a Radio Access Network, RAN, serving a User Equipment, UE; determining that the UE requests disaster roaming service by determining that a PLMN Identifier, ID of an International Mobile Subscriber Identity, IMSI based Subscription Concealed Identifier, SUCI of the UE is in the first disaster roaming PLMN list; and sending to an Authentication Server Function, AUSF a Nausf_UEAuthentication_Authenticate Request including the disaster roaming request indication, responsive to determining that the UE requests disaster roaming service and determining that the UE is to be authenticated.

2. The method of claim 1, wherein:

the first network node comprises an Access Management Function, AMF.

3. The method of claim 1, wherein determining that the UE is to be authenticated further comprises determining that the UE is identified by a UE identifier.

4. The method of claim 3, wherein the UE identifier is a network-specific identifier based Subscription Concealed Identifier, SUCI, or International Mobile Subscriber Identity, IMSI, based SUCI.

5. The method of claim 3, wherein the IMSI based SUCI indicates a PLMN ID of a home PLMN (HPLMN) of the UE in disaster condition.

6. The method of claim 5, wherein in the HPLMN in disaster condition is in the first disaster roaming PLMN list.

7. The method of claim 5, further comprising:

obtaining a second disaster roaming PLMN list that does not include the HPLMN of the UE.

8. The method of claim 7, further comprising:

determining that the UE is in a 5GMM-CONNECTED mode; and performing a UE configuration update procedure with an indication that a disaster condition of the HPLMN of the UE was resolved, or triggering the UE to perform a mobility registration update and rejecting the mobility registration update with an indication that the disaster condition in the HPLMN of the UE is resolved.

9. The method of claim 5, further comprising:

determining that the UE is in a 5GMM-IDLE mode and attempts to move to a 5GMM-CONNECTED mode; and rejecting an initial Non-Access Stratum, NAS, request with an indication that a disaster condition in the HPLMN of the UE was resolved.

10. A first network node comprising processing circuitry configured to cause the first network node to: obtain a first disaster roaming Public Land Mobile Network, PLMN, list from a Radio Access Network, RAN, serving a User Equipment, UE; determining that the UE requests disaster roaming service by determining that a PLMN Identifier, ID of an International Mobile Subscriber Identity, IMSI based Subscription Concealed Identifier, SUCI of the UE is in the first disaster roaming PLMN list; and send to an Authentication Server Function, AUSF a Nausf_UEAuthentication_Authenticate Request including the disaster roaming request indication, responsive to determining that the UE requests disaster roaming service and determining that the UE is to be authenticated.

* * * * *